June 4, 1957 W. S. SHERMAN ET AL 2,794,282

MAGNETICALLY-OPERATED INDEX

Filed March 14, 1955 2 Sheets-Sheet 1

Inventors.
William S. Sherman.
Richard S. Krause.
By. Wilson & Geppert
Attorneys.

MAGNETICALLY-OPERATED INDEX

Filed March 14, 1955 2 Sheets-Sheet 2

Inventors.
William S. Sherman.
Richard S. Krause.
By. Wilson & Geppert
Attorneys.

2,794,282

MAGNETICALLY-OPERATED INDEX

William S. Sherman and Richard S. Krause, Chicago, Ill., assignors to Cory Corporation, Chicago, Ill., a corporation of Delaware Application March 14, 1955, Serial No. 493,882

5 Claims. (Cl. 40—104)

The present invention relates generally to a novel index or register containing multiple cards or sheets carrying in alphabetical or in any predetermined or desired arrangement selected data or information, such as names, telephone numbers, addresses, selected recipes, pricing sheets or records, catalogs of parts or other information, etc., and more particularly to a novel manually initiated and magnetically-operated means for selecting and exposing the card or sheet carrying the desired information or selected data.

An important object of the present invention is the provision of a novel means and mechanism for selecting and magnetically coupling a selected card or sheet to the hinged cover of an index whereby when the cover is released it carries the selected card or sheet with it to open, exposed position.

A further object of the present invention is the provision of a novel magnetically-operated selecting means movable into registry with one of a plurality of metal keys or tabs preferably arranged in a selected or prearranged and designated order, whereby when the operator moves the selecting means to a position over a selected tab or key the latter is attracted by the magnet of the selecting means and this selected tab or key and its card or sheet containing the desired data or information are automatically swung to open position to expose the selected card or sheet with its data or information, when released.

The present invention further comprehends the provision of a novel magnetic selector and to a novel means and mechanism for coupling the desired card or sheet to the magnetic selecter whereby when the cover is released the selected card or sheet and those thereabove ar elevated to open position.

Another important object of the present invention is the provision of a novel index having a cover and multiple index cards or sheets any one of which may be magntically coupled to the cover and when the cover is released the cover and indexed card or sheet are moved to open position in which the information or data on the indexed card or sheet and on the one immediately beneath it are exposed for complete view. The indexed information may be disposed either longitudinally or transversely of the index cards, as desired.

A further object of the present invention is the provision of a novel index and magnetic selector in which any one of a group of cards arranged in stacked relation is adapted to be magnetically coupled to the cover in such manner that when the cover is opened with one of the group of cards coupled thereto, all cards thereabove are retained in the cover by the selector but with the selector so constructed and arranged that with the cover open it may be moved successively over the coupling means of any or all of the cards in the cover whereby the operator may quickly leaf through these cards to examine their contents or contained information.

The present invention further comprehends a novel index or register in which the cover and selected card may be opened to two positions, in one of which the open cover and indexed card are moved through an angle of approximately 120° and in the other the open cover and indexed card are moved through an angle of approximately 180° with respect to the succeeding card. When in fully open position, the cover lies substantially flat on a supporting surface whereby the operator may readily and easily make any desired entry upon the open or exposed cards.

Another object of the present invention is to provide a novel system of indexing cards or sheets each provided with a tab, the tabs of adjacent cards of a stack being arranged in offset or staggered relation and each tab provided with a metal part or insert adapted to be attracted by a manually movable magnetic selector.

Further objects are to provide a construction of maximum simplicity, efficiency, economy and ease of assembly and operation, and such further objects, advantages and capabilities as will later more fully appear and are inherently possessed thereby.

Figures 1, 2, 7, 8, 9, 10:
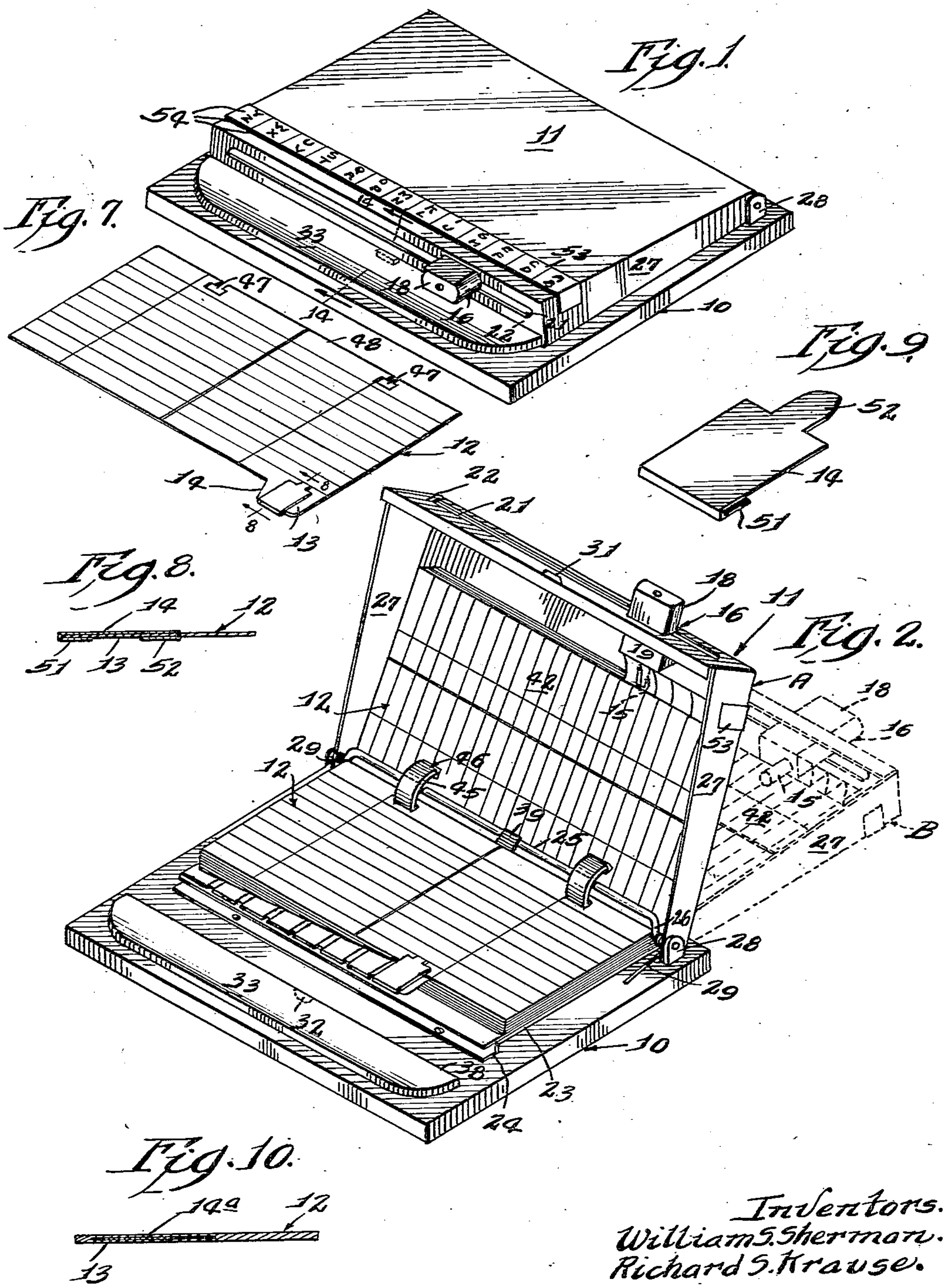
Figure 1 is a perspective view of the novel index in closed position.
Fig. 2 is another view in perspective of the novel index but with the cover shown in full lines in one of its open positions and in dotted outline in its other open position.
Fig. 7 is a view in perspective of one of the index cards or sheets and showing the metal part or insert attached to or incorporated in the projecting tab.
Fig. 8 is a fagmentary view in vertical cross section taken in a plane represented by the line 8—8 of Fig. 7.
Fig. 9 is a view in perspective of one of the metal parts to be attached to a tab.
Fig. 10 is an enlarged fragmentary view in vertical cross section of the tab end of a modified index card in which the the metal is inserted into the tab of the card rather than on it as in Fig. 8.

Referring more particularly to the disclosure in the drawings, the novel index or register includes a base 10 and a pivotally mounted cover 11 adapted to receive a stack or plurality of indexing cards or sheets 12 upon which the name, telephone number, address, selected recipes, pricing sheets or records, catalog sheets and/or other selected information or data is placed. These cards or sheets (hereinafter referred to as cards) are arranged in stacked relation and are preferably of uniform dimensions and, except for the bottom card, each is provided with an outwardly extending and transversely staggered projection or tab 13 to which is affixed a ferrous metal covering 14 (Figs. 7 and 9) or in which is inserted a ferrous metal insert 14ᵃ (Fig. 10) capable of being attracted by and coupled to a magnet 15 carried by a magnetic selector 16.

The selector 16 is slotted at 17 (Figs. 4 and 11) to provide an outer knob or button 18 and an inner projection 19 in which the magnet 15 is embedded, with the slotted, reduced portion 17 conformably received in a longitudinally extending slot 21 (Figs. 1, 2, 4 and 14) in a depending flange 22 forming the front wall of the cover 11. Thus the knob or button 18 may be manually moved longitudinally in the slot 21 to move the magnet over the metal covering 14 or insert 14ᵃ of the laterally spaced tabs or projections 13 on the cards 12. To facilitate sliding movement of the magnet 15 over these coverings or inserts and to uncouple and couple the cards thereto, the magnet is preferably rounded as shown in Figs. 4 and 11.

As the cards are stacked in vertical alignment but with the tabs 13 and the metal covering or insert for each being disposed in laterally and vertically staggered relation and even though these cards and their tabs are relatively thin, provision has been made beneath the stack to gradually elevate the lower cards whereby the tabs 13 are all disposed substantially the same distance or spacing from the lower face of the magnet 15. This is accomplished by providing the base with an elevated ledge 23 upon which the cards 12 rest and incllining and supporting this ledge in inclined position by a tapered or inclined bracket or support 24 in the manner shown in Fig. 5.

The cover 11 is pivotally mounted upon a cross pin or rod 25 which is offset adjacent its opposite ends 26 with these ends projecting through the opposite side walls 27 of the cover and journalled in upstanding brackets 28 at the opposie sides of the base 10. Coil springs 29 encompassing the ends 26 of the cross pin or rod 25 and having one end bearing against the interior of the cover 11 and the other end against the base 10 spring-bias or spring-load the cover 11 and its contained cards 12 into elevated position when the cover is released. This release is accomplished by providing the depending flange or front wall 22 of the cover 11 with a detent or keeper 31 adapted to be engaged in a recess 32 in a hold and release bar or latch member 33 projecting across the base 10 (Fig. 2). This bar or latch member has depending lugs 34 mounted on the forward or free end 35 of a pair of spaced leaf springs 36, the other end of these leaf springs being attached or affixed at 37 to the underside of the base. Thus by depressing the bar or latch member 33 with the cover 11 closed, the notch or recess 32 in the edge 38 of the bar or latch member 33 (Figs 2 and 14) rides over the detent or keeper 31 and the cover is released and swings to the position A in Fig. 2. In that position, the cover 11 and its cross pin or rod 25 are tensionally retained by a leaf spring 39 carried by the depending rear flange 41 of the cover and having its free end tensionally and frictionally bearing against the cross pin or rod 25 and by a leaf spring 43 having its free end engaging the flange 41, whereby to maintain the cover 11 open in the position A.

Figures 3, 4, 5, 6, 11, 12, 13, 14, 15:
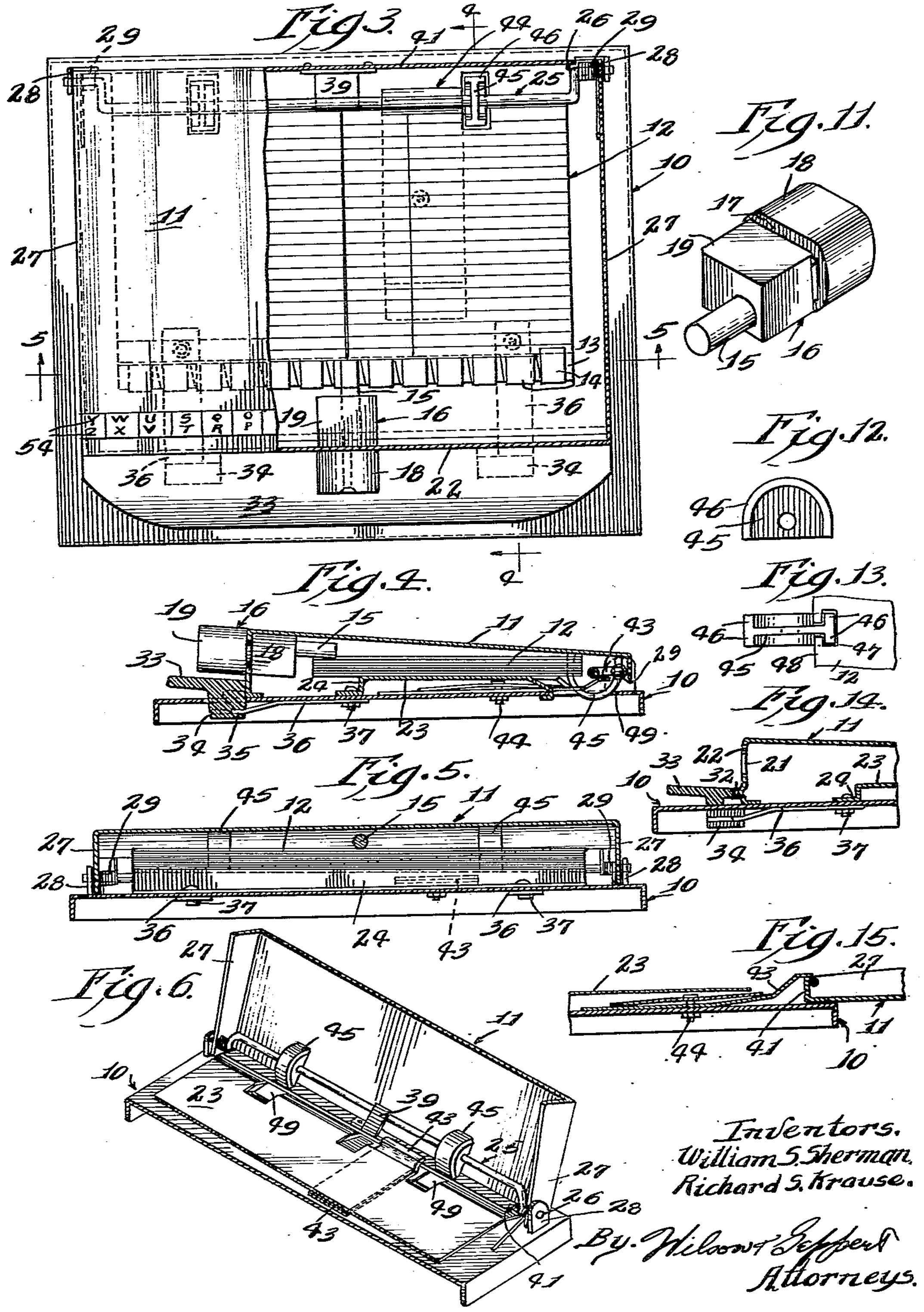
Fig. 3 is a top plan view of the novel index assembly in closed position but with portions of the cover broken away to show the interior construction and the contained stack of indexing cards or sheets.
Fig. 4 is a transverse view in vertical cross section taken in a plane represented by the line 4—4 of Fig. 3 and viewed in the direction of the arrows.
Fig. 5 is a longitudinal view in vertical cross section taken in a plane represented by the line 5—5 of Fig. 3 and viewed in the direction of the arrows.
Fig. 6 is a fragmentary view in perspective of the rear or pivotally mounted end of the index assembly and showing the cover in an open or elevated position.
Fig. 11 is a view in perspective of the novel magnetic selector.
Fig. 12 is a view in side elevation of one of the supports for pivotally and detachably mounting a stack of cards or sheets in the index.
Fig. 13 is a fragmentary view showing the bottom of one of the supports of Fig. 12 and the manner in which a card or sheet is detachably connected thereto.
Fig. 14 is a fragmentary view in vertical cross section of the forward end of the assembly and showing the manner in which the cover is released upon depressing the hold and release bar or latch member, the view being taken on the line 14—14 of Fig. 1.
Fig. 15 is a fragmentary view in vertical cross section through the rear of the base and cover with the latter released and moved to fully open position.

To facilitate making an entry on the underside 42 of a card 12 held in the cover 11 by the magnet 15, the cover may be manually moved to the position B of Fig. 2 and the postions shown in Fig. 15, in which the cover 11 and its contained cards 12 lie substantially flat on a table, desk or other supporting surface.

When moving the cover 11 manually to the position B shown in dotted outline in Fig. 2 and also in full lines in the fragmentary view of Fig. 15 from which the leaf spring 39 has been omitted, the edge of the flange 41 spring 43, is elevated and places tension on the engaged forming the rear wall of the cover 11 and which is shown in Fig. 6 as seated below the bent free end of the leaf free end of the leaf spring 43 as shown in Fig. 15, whereby the cover is tensionally held in its fully open position. This leaf spring 43 is shown in Figs. 4 and 5 as located upon the upper surface of the base 10 and anchored intermediate its ends at 44 to the base.

To mount the cards 12 for pivotal movement in the cover 11 and to permit these cards to be removed or replaced and to add new cards, the cover is provided with spaced supports 45 affixed thereto. As shown in Figs. 3, 12 and 13, these supports are provided with oppositely projecting peripheral flanges 46 adapted to receive the complementary slots 47 (Fig. 7) in the rear or anchored edge 48 of the cards. These cards 12 being relatively thin, the portions of the cards defining the slots 47 may readily be forced over the peripheral flanges 46 of the supports 45 to detachably mount the cards thereon. To permit the cover to be moved to its lowered, closed position as in Figs. 1 and 3, the base 10 and the ledge 23 are slotted at 49 (Figs. 4 and 6) to receive the arcuate portion of the supports 45.

The thin metal or magnetizable covering 14 (Figs. 7, 8 and 9) may be affixed to the tab 13 by means of an inturned flange 51 adapted to be bent or formed over the forward edge of the tab, and a locking projection 52 adapted to project through a narrow slot in the card 12 and bent forwardly. Fig. 10 shows the magnetizable metal 14ᵃ, such as soft iron, embedded or inserted into the tab 13 between laminations thereof. In either form, the metal covering 14 or insert 14ᵃ are readily attracted by the magnet 15 when the latter is manually moved thereover by the operator.

By rounding or contouring the magnet 15 in the manner shown, it may be readily moved over the adjacent tabs to uncouple an attracted card and to magnetically couple thereto another card. This is true whether the cover 11 is closed and the cards 12 carried thereby are moved to their lowered position, or whether the cover 11 is opened and houses and carries one or more cards. In the latter event, the operator may move the selector 16 in its slot 21 in the flange 22 to permit the desired cards to be released from the magnet 15 whereby the operator may quickly and conveniently leaf through the cards in the cover.

The cover 11 is preferably provided with a transparent member 53 adapted to span the cover and receive and retain therebeneath a sheet containing indexing letters, numbers or other identifying marking 54 to register with the tabs 13 on the cards 12 in the index containing the identified or indexed information or data. If desired, the markings 54 may be impressed or otherwise applied direct to the cover.

The base and cover of the index may be of any material suitable for the purpose, including metal or plastic.

From the above description and the disclosure in the drawings, it will be apparent that the present invention comprehends a novel index in which any of the indexing cards may be magnetically coupled to the cover merely by the operator moving the magnetic selector which is slidably carried by the cover 11, to the desired location beneath the identifying marking 54 on the cover, and then upon depressing the bar or latch member 33 the spring-actuated cover is released and automatically moved to open position A (Fig. 2) in which it exposes the underside of the selected card carried therewith and the card therebeneath which remains on the ledge 23 of the base 10. If desired, the operator may move the cover 11 and its contained cards 12 to the fully open or lowered position B (Fig. 2).

Having thus disclosed the invention, we claim:

1. An index comprising a base, a spring-loaded cover pivotally mounted at the rear upon the base and spring-biased to elevated, open position, said cover having a depending front wall provided with a longitudinal slot extending the greater length of said wall, a stack of index cards pivotally mounted at the rear in the cover, means for latching the front wall of the cover in closed position upon the base, including a detent on said front wall and a latch bar pivotally mounted in and extending across the base forwardly of the front wall of the cover and having a part adapted to engage the detent and retain the cover in its lowered, closed position upon the base, and magnetic selecting means slidably mounted in the slot of said front wall for selecting a desired card from the stack and simultaneously lifting the selected card and coupling this card to the cover whereby upon release of the latch member by depressing the latch bar the cover is spring-biased to open position with said selecting means elevating the selected card and holding this card in exposed position in the cover, said magnetic selecting means including a selector freely slidable in the slot in the front wall of said cover and adjacent said latch bar and provided with a magnet projecting rearwardly from the selector into the cover, and a magnetizable part on each of said cards disposed below said magnet but adjacent to its path of travel whereby when the selector is moved in the slot across the front wall of the cover the magnet is moved over the magnetizable part of said cards to select and pick up a desired card.

2. An index comprising a base, a cover pivotally mounted at one end upon the base and at its other end provided with a wall having a longitudinal slot, means for spring-biasing the cover to its elevated, open position, means for latching said cover to the base, means for releasing said latching means and permitting said cover to move to elevated, open position, a stack of index cards pivotally mounted at one end in the cover with each card having a projecting tab and the tabs of successive cards arranged in offset relation, indicia on the cover adjacent its slot and corresponding with indicia on the cards of the stack, a magnetizable part for each tab, and a magnetic selecting means including a selector guided in the slot in the cover and manually movable laterally in said slot for alignment with a selected indicia and a magnet aligned with and movable by said selector over successive tabs of the stack of cards to the selected position to thereat magnetically select and pick up the magnetizable part on the selected card and magnetically couple this selected card to said cover and raise said selected card with the cover when said latching means is released, said selector being freely movable in said slot to move the magnet over the projecting tab of successive cards and thereby attract and release the magnetizable part of successive tabs when the selector is moved thereover, and when the cover is in open position the operator may move the magnet on the selector freely over the tabs of successive cards in the cover and permit leafing through these last mentioned cards for access to their contained information.

3. An index comprising a base, a cover hinged at one end to the base with its opposite end movable from contact with the base to an elevated position and said opposite end provided with an elongated slot, a stack of index cards pivotally mounted in the hinged end of the cover and each provided with a magnetizable part with the magnetizable part of successive cards of the stack arranged in staggered relation, an elevated support on the base for the stack of cards with said support having a laterally inclined upper surface to position the cards with the staggered magnetizable parts of successive cards in the stack disposed in a substantially horizontal plane on said inclined upper surface, means for spring-biasing the cover to open position for access to a selected card, a latch bar pivotally mounted in the base adjacent said opposite end of the cover and having means for detachably connecting the cover to the base, a magnetic selector movable in said slot in the cover and including a magnet movable therewith, said index having spaced indicia coextensive with the slot and aligned with the magnetizable part of successive cards whereby said selector when moved in the slot into alignment with a selected indicia simultaneously moves the magnet over the top of the magnetizable part of successive cards to a position over the selected card and thereat selects, attracts and magnetically couples the upper surface of the magnetizable part of the selected card of the stack to the magnet, said latching bar when depressed releasing the cover when a selection has been made whereupon the magnet lifts the magnetically coupled tab of the selected card and carries this selected card and those above it to open position with the cover, the card below the selected card remaining exposed on the base.

4. An index comprising a base, a cover pivotally mounted at one end upon the base and its opposite end movable from closed position in which it lies flat on the base to an elevated open position, said cover having a wall provided with a longitudinal slot and spaced indicia adjacent said slot, a stack of index cards pivotally mounted at one end in the cover and said cards each having along one edge a projecting tab aligned with the indicia on the cover and a magnetizable part on the tab of successive cards, said tabs and their magnetizable parts of successive cards being disposed in staggered and offset relation, a magnetic selector movable in said slot and across said cover and carrying a magnet projecting inwardly from the slot and beneath the cover and movable between said cover and the upper face of the projecting tabs on said cards for simultaneously selecting and picking up a desired card from the stack when said selector and its magnet are moved laterally in said slot and over said tabs of successive cards until they are aligned with the tab of a selected card, said magnet thereupon attracting and picking up the tab of the selected card and magnetically coupling the selected card to the cover, and latching means for latching the cover in closed position upon the base and for releasing said cover upon selection of a card whereupon the cover and the selected card are spring-biased to open position with the selected card held in exposed position in the cover.

5. An index according to claim 4, in which the base is provided with an inclined upper surface for supporting the stack of cards and positioning the magnetizable part of successive cards of the stack approximately the same distance below the path of travel of the magnet.

References Cited in the file of this patent

UNITED STATES PATENTS

| | | |
|---|---|---|
| 1,451,614 | Hoecke | Apr. 10, 1923 |
| 1,633,408 | Halmi | June 21, 1927 |
| 2,186,436 | Shaler | Jan. 9, 1940 |
| 2,269,767 | Jayne | Jan. 13, 1942 |
| 2,638,098 | Toepper | May 12, 1953 |
| 2,717,605 | Lang | Sept. 13, 1955 |